US009456117B2

(12) United States Patent
Rentschler

(10) Patent No.: US 9,456,117 B2
(45) Date of Patent: Sep. 27, 2016

(54) ADAPTIVE LIGHTING APPARATUS FOR HIGH-SPEED IMAGE RECORDINGS, AND METHOD FOR CALIBRATING SUCH A LIGHTING APPARATUS

(71) Applicant: Dr. Ing. h.c. F. Porsche Aktiengesellschaft, Stuttgart (DE)

(72) Inventor: Walter Rentschler, Althengstett (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 2 days.

(21) Appl. No.: 14/566,814

(22) Filed: Dec. 11, 2014

(65) Prior Publication Data

US 2015/0172524 A1    Jun. 18, 2015

(30) Foreign Application Priority Data

Dec. 12, 2013  (DE) .................. 10 2013 113 972

(51) Int. Cl.
*H04N 5/222* (2006.01)
*H04N 5/225* (2006.01)
*H04N 5/235* (2006.01)

(52) U.S. Cl.
CPC .......... *H04N 5/2256* (2013.01); *H04N 5/2351* (2013.01); *H04N 5/2354* (2013.01)

(58) Field of Classification Search
USPC ....................................... 348/370
See application file for complete search history.

(56) References Cited

U.S. PATENT DOCUMENTS

| 2010/0156319 | A1* | 6/2010 | Melanson | .......... H05B 33/0839 315/297 |
|---|---|---|---|---|
| 2010/0301755 | A1* | 12/2010 | Pance | ................ H05B 33/0869 315/149 |
| 2012/0044277 | A1* | 2/2012 | Adachi | ................ G09G 3/3426 345/690 |

FOREIGN PATENT DOCUMENTS

| DE | 19826288 | 12/1999 |
|---|---|---|
| DE | 10056325 | 1/2009 |
| DE | 102011075369 | 11/2012 |

* cited by examiner

*Primary Examiner* — Roberto Velez
*Assistant Examiner* — Stephen Coleman
(74) *Attorney, Agent, or Firm* — Gerald E. Hespos; Michael J. Porco; Matthew T. Hespos

(57) ABSTRACT

An adaptive lighting apparatus (1) for high-speed image recordings for an object (2) uses a number of high-speed image recording devices (30, 31, 32), with a number of LED lighting units (10-18) having LED illuminants (100-104) that can emit light to light the object (2) during operation. An actuator actuates the LED lighting units (10-18) individually or in groups. A control device (4) controls the actuator, and has a memory that stores parameter sets for actuating the LED lighting units (10-18) for retrieval. An evaluation device calibrates the adaptive lighting apparatus (1) and then captures and evaluates the images of the object (2) that are recorded by the high-speed image recording devices (30, 31, 32) and calculates therefrom the parameter sets for adaptively actuating the LED lighting units (10-18).

10 Claims, 2 Drawing Sheets

ADAPTIVE LIGHTING APPARATUS FOR HIGH-SPEED IMAGE RECORDINGS, AND METHOD FOR CALIBRATING SUCH A LIGHTING APPARATUS

CROSS REFERENCE TO RELATED APPLICATION

This application claims priority under 35 USC 119 to German Patent Appl. No. 10 2013 113 972.8 filed on Dec. 12, 2013, the entire disclosure of which is incorporated herein by reference.

BACKGROUND

1. Field of the Invention

The invention relates to an adaptive lighting apparatus for high-speed image recordings for an object by means of a number of high-speed image recording devices. Furthermore, the present invention relates to a method for calibrating such a lighting apparatus.

2. Description of the Related Art

The change in light source technology that has been apparent for some time, particularly in respect of the significant increase in power from light emitting diodes, can be seen not just in motor vehicle exterior lighting. Light emitting diodes are now frequently used as room lighting too and as technical lighting sources. Although initial applications in which extreme brightness requirements apply, such as the lighting of safety trial scenes when examining and simulating motor vehicle accidents, are being discussed, they are currently still right at the start of their technological application.

Vehicle safety has a high level of significance for the development of motor vehicles. Therefore, crash trials, crash simulations or the checking of safety-relevant components of a motor vehicle in appropriately designed simulation arrangements involve(s) the use of special high-speed image recording devices that typically have recording frequencies of between 1000 and 2000 frames per second in order to allow as many details as possible to be recorded, so that the crash behavior can be analyzed very precisely. At such high recording speeds, avoiding any motion blur requires short exposure times that are typically between 200 and 400 microseconds.

If the distance covered by the moving object to be examined (motor vehicle) during performance of the trial—particularly taking account of the depiction scale—is shorter, within the shutter opening time of the high-speed image recording device, than the interval between two adjacent light-sensitive sensor points (sensor pixels) of an image capture sensor means of the high-speed image recording device, movement of the object is no longer discernible. Therefore, it is no longer possible to observe any motion blur either. The setting of the exposure time of the high-speed image recording device therefore forms a suitable compromise between the avoidance of undesirable motion blur and a maximum exposure time, so that it is possible to have sufficient incidence of photons on the image capture sensor means of the high-speed image recording device, and hence sufficient image brightness can be achieved. Besides the exposure time, a further variable is the aperture value of an aperture means of the high-speed image recording device, which likewise has a direct influence on the resulting depth of focus.

To meet the aforementioned requirements of high-speed image recording devices, the lighting apparatus used to illuminate the object during image recording must—at image recording frequencies in the aforementioned order of magnitude—produce a very high luminous flux so that the object can be illuminated to a sufficient extent. The lighting intensity at the object is typically in an order of magnitude of approximately 80 000 to 160 000 lux for a luminous flux of approximately 2.5 to 5.5 Mlm (megalumens). If such a large quantity of light is shone onto the object on trial (test vehicle with trial setup), there are not only illuminated regions but also relatively pronounced regions of shade. The light from the lighting apparatus that is reflected by the object results in different bright/dark profiles in different spatial directions.

A simulation arrangement for motor vehicle accidents is disclosed in DE 198 26 288 B4, for example.

The invention is based on the object of providing a lighting apparatus of the type cited at the outset and also a method for calibrating such a lighting apparatus that can be used to achieve particularly homogeneous illumination of an object that needs to be lit for high-speed image recordings.

SUMMARY OF THE INVENTION

An inventive adaptive lighting apparatus for high-speed image recordings for an object by means of a number of high-speed image recording devices comprises:

a number of LED lighting units having a multiplicity of LED illuminants that can emit light to light the object during operation, actuator means for actuating the LED lighting units, which are designed to vary at least the lighting intensities and/or the radiation directions of the LED illuminants individually or in groups, a control device for controlling the actuator means, which comprises memory means that store parameter sets for actuating the LED lighting units for retrieval, and also an evaluation device for calibrating the adaptive lighting apparatus, which is set up to capture and evaluate the images of the object that are recorded by the high-speed image recording devices and to calculate therefrom the parameter sets for adaptively actuating the LED lighting units. The inventive lighting apparatus typically comprises over 10 000 light emitting diodes that are combined in a number of LED lighting units. By virtue of appropriate actuation of the LED lighting units, which results in a variation in the lighting intensity (brightness) and/or in the radiation angles (particularly angles of azimuth and/or inclination) of the LED lighting units or the LED illuminants, the inventive lighting apparatus allows inhomogeneous lighting to be produced on the object such that after reflection into the high-speed image recording devices an evenly illuminated object image can be made available.

The evaluation device may be in a form to perform image brightness analysis for the object lit by the lighting apparatus and can generate a brightness histogram. From such a histogram, it is possible to calculate various characteristic quantities for the recorded image that can form a basis for calibrating the adaptive lighting apparatus. In this case, particularly relevant characteristic quantities are the frequency of the grayscale-valve levels, the mean value of all the grayscale values and the variance of the grayscale values.

The memory means may be configured to store parameter sets for adaptively lighting a plurality of objects in a plurality of different ambient conditions and/or trial conditions that can be selectively retrieved by the control device.

The stored parameter sets advantageously allow a very rapid change between different objects to be lit or ambient and/or trial conditions.

To allow the lighting of the object to be reproducible, each of the high-speed image recording devices should be able to be explicitly associated with a lighting subregion on the lit object. It is also necessary for the LED lighting units of the lighting apparatus to be able to be explicitly associated with the location that they light on the object. In a particularly advantageous embodiment, it is therefore proposed that the memory means store location information for the LED lighting units for retrieval, said location information being able to be used to associate the LED lighting units with those subregions that they can light on the object.

The LED illuminants of the LED lighting units may be arranged above one another in a number m of rows and beside one another in a number n of columns. This allows even illumination of the object to be achieved. In addition, the LED illuminants arranged in the four corner regions are advantageously also suitable for local calibration of the relevant LED lighting unit.

An inventive method comprises the steps of
a) activation of the lighting apparatus and lighting of an illumination side of the object by means of the LED illuminants of at least some of the LED lighting units,
b) recording of a plurality of images of the object by means of a number of high-speed image recording devices,
c) analysis of an image brightness for each image and reduction of a brightness histogram for capturing overexposed and underexposed regions of the object,
d) association of the LED lighting units with the regions of the object that are lit thereby,
e) provision of a plurality of parameters for actuating the LED lighting units in order to set at least the lighting intensities and/or the radiation directions of the LED illuminants of the LED lighting units that are used to light the object,
f) recording of a plurality of images of the object by means of the high-speed image recording devices,
g) calculation of an actual correlation from the images recorded in step f) and comparison of the actual correlation with a required correlation,
h) repetition of steps e) to g) with changed parameters until the actual correlation essentially corresponds to the required correlation,
i) storage of the parameters in at least one memory means.

The inventive method advantageously allows automated adaptation of the lighting intensities and/or the radiation directions (by means of adjustment of the angles of azimuth and/or inclination) of the LED illuminants of the LED lighting units of the lighting apparatus. The method allows a transition from laborious visual/manual light setting for the lighting apparatus to an automated iterative adaptation process that is supported in terms of computation by an evaluation device. The enormous time saving for the setting of the best possible illumination of the object that the method presented here allows can achieve a considerable increase in efficiency in the "crash trial" process. Method steps e) to g) are repeated until the actual correlation essentially corresponds to the required correlation and hence comes closest to it. A significant change in comparison with earlier lighting techniques also involves the LED illuminants of the LED lighting units being operated not just at 100% or 50% but rather in a range from 30% to 100% (possibly even up to 200%) of their optical rated power. In this case, the resulting brightness can be selectively increased or reduced particularly in steps of 10%. Different brightness zones and especially disturbing total reflections, which are brought about by an uneven topography (angle of reflection) and by differently reflective material properties of the lit object or by superimpositions of the light emitted by two or more LED illuminants on the object, for example, can be avoided by means of the automated adaptation to any object topographies. The high-speed image recording devices installed at a fixed location in a safety trial arrangement, for example, are used for the purpose of capturing the light distribution on the object that is illuminated using the lighting apparatus. In this case, particularly the image section, the focal length, the recording frequency and the shutter opening times correlate to the values of real trial performance. The lighting apparatus is switched on for a short period and the high-speed image recording devices capture a short test sequence, which may comprise ten frames, for example. This test sequence is made available to an evaluation device that is used to perform brightness analysis for the object lit by the lighting apparatus and to generate a brightness histogram. Such a histogram shows the relative or absolute frequency of the brightness levels of the recorded image, particularly in the form of a table or a graphic. From this histogram, it is possible to calculate various characteristic quantities for the recorded image. For the method described here, three characteristic quantities are of particular significance:
  I) frequency of the grayscale-valve levels,
  II) mean value of all the grayscale values and
  III) variance of the grayscale values.

To decrease the volume of data to be evaluated by the evaluation device and hence also the resulting evaluation or computation complexity, all of the grayscale-valve levels that the high-speed image recording devices can resolve can be simplistically divided and grouped into a useful (reduced) number of grayscale-value groups in a particularly advantageous manner. It is then thus necessary to evaluate not necessarily 12 bits (and hence 4096 gray levels) but rather only 100 gray-level groups, for example, which accordingly decreases the computation complexity. Although this simplification implies a certain fuzziness for the data analysis, it has no significant effect on the result in practice.

The basis for the characteristic values is therefore formed by the grayscale-value distribution (frequency of the individual grayscale-value levels), which is present in the form of the histogram. The calculated mean value of all the gray levels can be used to obtain particularly information about the global brightness of a recorded image of the object. If a large brightness variance is calculated from the recorded images, said brightness variance manifesting itself in a high level of variance of the grayscale values, this indicates significant bright/dark differences in the recorded image. The absolute order of magnitude in which these characteristic parameters must be in the case of the image material to be examined is initially ascertained merely empirically. By virtue of appropriately prescribed upper and lower brightness limits on the object and with due regard to the sensor properties of the high-speed image recording devices (in this context, particularly the spectral photosensitivity and dynamics can be mentioned), it is possible for excessively bright and excessively dark zones of the lit object and also total reflections to be located and eliminated.

By way of example, local calibration can be effected by virtue of the LED illuminants arranged at the four corner regions of each LED lighting unit being progressively activated at, by way of example, 50% of the brightness setting for a particular period of images (for example 5 images). Consequently, the object is lit by four cones of light in this way. These four cones of light contain the lighting field of the relevant LED lighting unit, which has 4×6=24 LED illuminants (which may each have a light emitting diode or groups of light emitting diodes), for example, which are split over four rows and six columns. In an image from the high-speed image recording device, these four cones of light with the area that they enclose are registered as "illumination field No. 1". All the further LED lighting units of the lighting apparatus are progressively activated as appropriate and the coordinates of the (in each case four) LED illuminants arranged in the corner regions are registered as corresponding illumination fields No. 2 to No. k, where k denotes the number of LED lighting units. In this case, the coordinates do not necessarily need to be stored in a unit of length. For the purpose of orientation and explicit association, the numberings of the four lit pixel recording groups of the relevant high-speed image recording device and the associated illumination field are registered.

The method contains geometric and light-engineering calibration of the lighting apparatus. First of all, the lighting apparatus emits an even stream of brightness onto the object to be lit. This object reflects the light as an inhomogeneous light distribution into the high-speed image recording devices. In the case of a motor vehicle, this inhomogeneous light distribution is caused by an irregular vehicle surface with its many and diverse, irregular radii and freeform surfaces, for example. The high-speed image recording devices positioned at a fixed location in various positions at different angles of azimuth and inclination with respect to the object amplify the resultant inhomogeneity of light still further. These inhomogeneities, which are ultimately visible in the depictions from the high-speed image recording devices, are counteracted in suitable fashion using the method presented here. The aim is to produce trial scenes that are illuminated as homogeneously as possible for the purpose of later qualitative and quantitative evaluation.

Similarities in the brightness distributions of the captured images from all the high-speed image recording devices arranged on the illumination side of the object may be calculated by the method of cross-correlation. Such cross-correlation allows simple analysis of similarities in the brightness distributions of all high-speed image recording devices that are arranged on the respective illumination side of the object and capture images of the object there. It is advantageous if this calculation involves the object (trial vehicle) being extracted from its image surroundings by means of an image processing operation. This advantageously allows really only the brightness distributions on the object to be taken into account and not additionally those from the insignificant surroundings of the object. The basis for the calculation of this cross-correlation is formed by the histogram already mentioned above and the characteristic quantities derived therefrom, frequency, mean value and variance of the grayscale values. This correlation value indicates the degree to which the brightness distributions of the various images from the high-speed image recording devices match. The best light setting for the LED illuminants for a plurality of high-speed image recording devices simultaneously is obtained in the case of that parameter configuration for which the correlation coefficient comes closest to the number 1.

Calibration of a first illumination side of the object may be followed by performance of method steps a) to i) for each further illumination side of the object. This provides appropriate parameters for actuating the LED illuminants of those LED lighting units that light the object on the remaining illumination sides.

To reduce the volumes of data that need to be installed by the memory means, the parameters for actuating the LED lighting units may be reduced to parameter sets by quantization.

To reduce the calibration and computation complexity, a particularly preferred embodiment may have provision for the calibration of the lighting apparatus to involve calibration starting values, which are obtained from simulations, being set as initialization parameters for actuating the LED lighting units. To ascertain very good starting values, it is expedient for a computer simulation to be preceded by a high-quality computation model of the practical calibration. By varying lighting parameters, real external vehicle contours from CAD data, the application of correct physical reflection, absorption and diffusion laws and also the properties of different light wavelengths (colors), etc., it is possible for the light adaptation parameters to be calculated to a high degree of quality in a model. The radiation angles and luminous fluxes calculated by simulation for the LED illuminants need only be transferred to the control device as initialization parameters. The control device sets the values calculated by simulation using the actuator means. An immediate test with these setting data shows the quality of the simulation. The calculated starting values for a good simulation program provide the confirmation that the calibrations reduced to a minimum nevertheless result in a sufficient number of setting data for reliably finding parameters in the best way—for all the high-speed image recording devices simultaneously.

DETAILED DESCRIPTION

Figure 1:
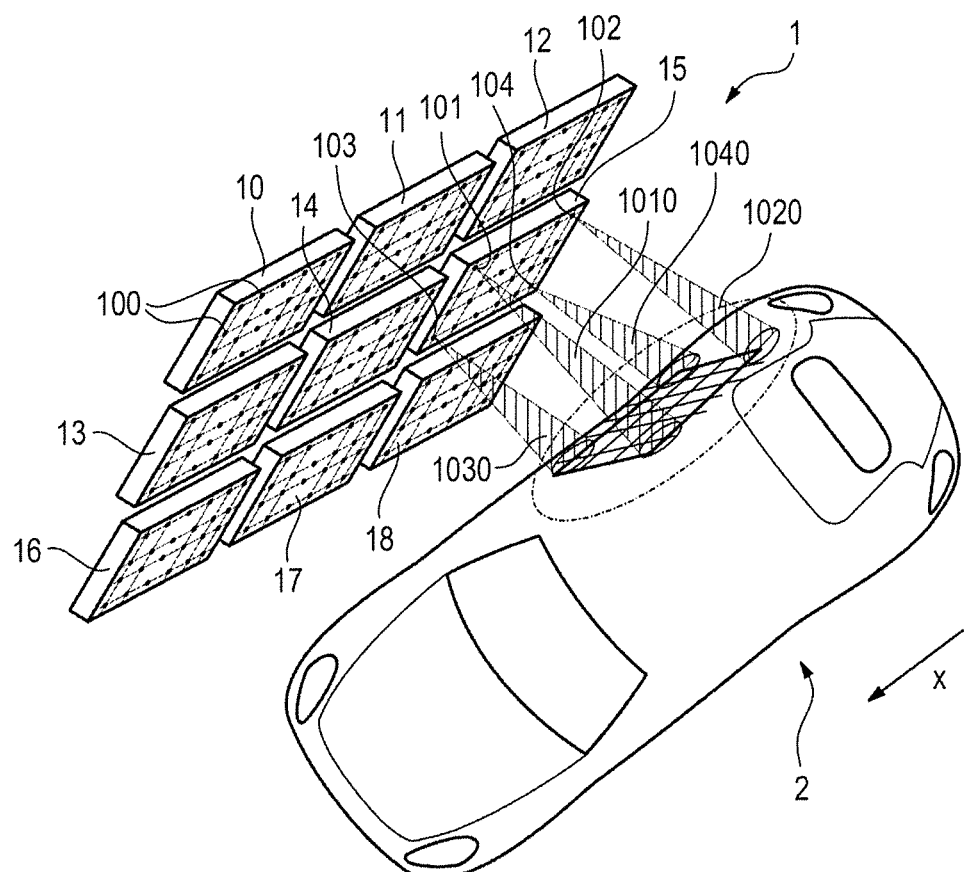
FIG. 1 is a perspective view of a portion of a lighting apparatus for high-speed image recordings that has a plurality of LED lighting units and of a motor vehicle lit by the lighting apparatus.

With reference to FIG. 1, the figure shows a portion of an adaptive lighting apparatus 1 for high-speed image recordings with an object 2 to be lit, which in the present case is a motor vehicle. Such a lighting apparatus 1 may be installed particularly in a safety trial arrangement and is suitable for lighting the object 2 for high-speed image recordings for crash tests or crash simulations.

The adaptive lighting apparatus 1 comprises a number of LED lighting units 10-18 having a multiplicity of, preferably individually actuatable, LED illuminants 100 that may each comprise at least one light-emitting diode or at least one light-emitting diode group. FIG. 1 shows a total of nine LED lighting units 10-18 that are arranged in three rows above one another and in three columns next to one another and are capable of lighting the right-hand side of the object (motor vehicle) 2 as seen in the vehicle longitudinal direction x.

Furthermore, the lighting apparatus 1 has further LED lighting units, not shown explicitly here, so as likewise to be able to light the left-hand side, when viewed in the vehicle longitudinal direction, and also the top of the object 2 (in the present case the roof of the motor vehicle), for example.

The lighting apparatus 1 is in a form such that during its operation a very high luminous flux can be produced so that the object 2 can be illuminated to a sufficient extent. The entire lighting intensity is typically in an order of magnitude of from approximately 80 000 to 160 000 lux for a luminous flux of from approximately 2.5 to 5.5 Mlm (megalumens). In addition, the lighting apparatus 1 is designed such that the LED illuminants 100 of the LED lighting units 10-18 can be actuated such that they can be operated not only at 100% or 50% but rather in a range from 30% to 100% (possibly even up to 200%) of their optical rated power. In this case, the resulting brightness can be selectively raised or reduced particularly in steps of 10%.

Figure 3:
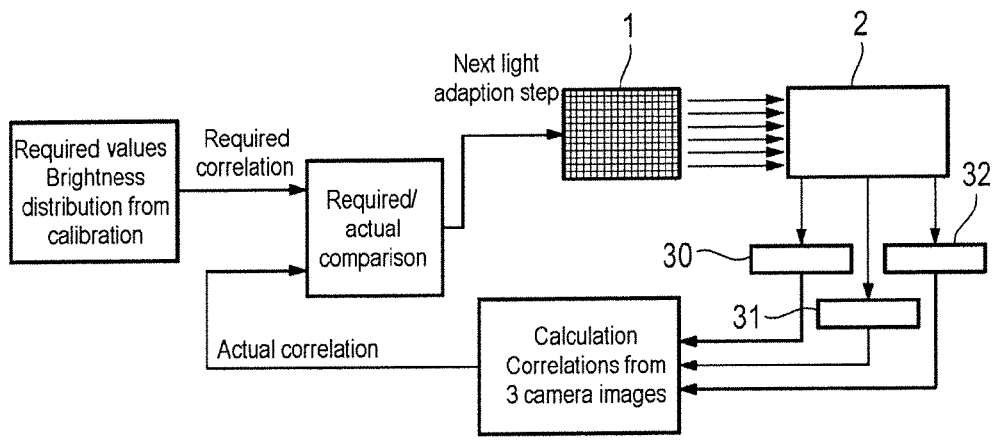
FIG. 3 is a schematic illustration of a calibration control loop for calibrating the lighting apparatus.

The image capture is effected using a number of high-speed image recording devices 30, 31, 32, particularly arranged with a fixed location. By way of example, FIG. 3 shows three such high-speed image recording devices 30, 31, 32 in a highly simplified schematic illustration. During operation, the object 2 is lit by the LED lighting units 10-18 of the lighting apparatus 1. The object 2 reflects the light as an inhomogeneous light distribution into the high-speed image recording devices 30, 31, 32. This inhomogeneous light distribution is caused particularly by irregular surfaces of the object 2, which may have diverse, irregular radii and freeform surfaces.

Different brightness zones and particularly disturbing total reflections, which are brought about by an uneven topography (reflection angle) and by differently reflective surface materials of the object 2 and also by superimpositions of the light emitted by two or more LED illuminants 100, 101, 102, 103, 104 on the object 2, for example, can be avoided by means of automated light adaptation to suit any object topographies, which will be explained in more detail below.

The preparatory work for this automated light adaptation needs to be performed in a work step that is separate from customary test operation. The high-speed image recording devices 30, 31, 32 installed at a fixed location in the safety trial arrangement can capture the light distribution on the object 2 that is illuminated with the lighting apparatus 1. In this case, particularly the image section, the focal length, the recording frequency and the shutter opening times correlate to the values of real trial performance.

The lighting apparatus 1 is first of all switched on for a short period, so that the LED lighting units 10-18 can emit light and thereby light the object 2. The high-speed image recording devices 30, 31, 32 first of all capture only a short test sequence, which may comprise ten frames, for example. This test sequence is made available to a computer-based evaluation device of the lighting apparatus 1, which is used to perform image brightness analysis for the object 2 lit by the lighting apparatus 1 and to generate a brightness histogram. Such a histogram shows the relative or absolute frequency of the brightness levels of the recorded image, particularly in the form of a table or a graphic. From this histogram, it is possible to calculate various characteristic quantities for the recorded image. In this case, three characteristic quantities are of particular significance:

I) frequency of the grayscale-value levels,
II) mean value of all the grayscale values and
III) variance of the grayscale values.

In order to decrease the volume of data to be evaluated by the evaluation device and hence also the resulting evaluation or computation complexity, all of the grayscale-value levels that the high-speed image recording devices 30, 31, 32 can resolve can be simplistically divided and grouped into a useful (reduced) number of grayscale-value groups in a particularly advantageous manner. It is then thus necessary to evaluate not necessarily 12 bits (and hence 4096 gray levels) but rather only 100 gray-level groups, for example, which accordingly decreases the computation complexity for the evaluation device. Although this simplification implies a certain fuzziness for the data analysis, it has no significant effect on the result in practice.

The basis for the characteristic values is therefore formed by the gray scale-value distribution (frequency of the individual grayscale-value levels), which is present in the form of the histogram. The calculated mean value of all the gray levels can be used to obtain particularly information about the global brightness of a recorded image of the object 2. If a large brightness variance is calculated from the recorded images, said brightness variance manifesting itself in a high level of variance of the grayscale values, this indicates significant bright/dark differences in the recorded image. The absolute order of magnitude in which these characteristic values must be in the case of the image material to be examined is initially ascertained merely empirically.

By virtue of appropriately prescribed upper and lower brightness limits on the object 2 and with due regard to the sensor properties of the high-speed image recording devices 30, 31, 32 (in this context, particularly the spectral photosensitivity and dynamics can be mentioned), it is possible for excessively bright and excessively dark zones of the lit object 2 and also total reflections to be located and eliminated.

Figure 2:
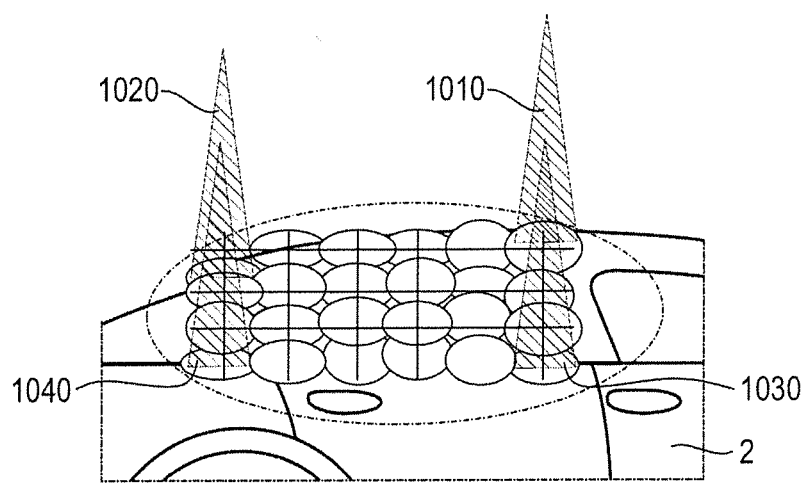
FIG. 2 is a schematic illustration of interpolation of the brightness areas between the LED illuminants arranged at the four corner regions of one of the LED lighting units.

It is of particular significance that each of the high-speed image recording devices 30, 31, 32 can be explicitly associated with their respective section region on the lit object 2. The LED lighting units 10-18 of the lighting apparatus 1 also need to be able to be explicitly associated with the location that they light on the object 2. These associations between the high-speed image recording devices 30, 31 and the LED lighting units 10-18 can be made by means of automated local calibration, which will be explained in more detail below with reference to FIGS. 1 and 2.

In a first step, the LED illuminants 101, 102, 103, 104 arranged at the four corner regions of each of the total of k LED lighting units 10-18 are progressively activated with, by way of example, 50% of the brightness setting for a particular period, so that five images of the object 2 can be captured, for example. This situation is shown by way of example in FIG. 1 for the LED lighting unit provided with the reference symbol 15. Consequently, the object 2 is lit by four cones of light 1010, 1020, 1030, 1040 in this way. The region bounded by the four cones of light 1010, 1020, 1030, 1040 at the corners contains the lighting field of the relevant LED lighting unit 15, which may have 4×6=24 LED illuminants 100, 101, 102, 103, 104, for example, which are split over four rows and six columns. In the image from one of the high-speed image recording devices 30, 31, 32, these four cones of light 1010, 1020, 1030, 1040 with the area they enclose are registered as "illumination field No. 1". All the further LED lighting units 10-18 of the lighting apparatus 1 are progressively activated as appropriate and the coordinates of the (in each case four) light emitting diodes 101, 102, 103, 104 arranged at the corner regions of each of the LED lighting units 10-18 are registered as corresponding illumination fields No. 2 to No. k. In this case, the coordinates do not necessarily need to be stored in a unit of length. For the purpose of orientation and explicit association, the numberings of the four lit pixel recording groups of the relevant high-speed image recording device 30, 31, 32 and the associated illumination field are registered and are stored in memory means of the evaluation device.

Assuming that the basic setting of the LED lighting units 10-18 means that there are no overlaps, gaps in the lighting or the like, all the LED lighting units 10-18 of the lighting apparatus 1 can be activated in a next step. From an individual image view from one of the high-speed image recording devices 30, 31, 32, it is very probable that very good light homogeneity cannot be expected for an initial setting. However, the initially performed calibration means that it is known which of the LED lighting units 10-18 emit too much or too little light onto the object 2 that is to be lit. This differs on the basis of the sites of the high-speed image recording devices 30, 31, 32 on the illumination side of the object 2. Appropriate interpolation means that the individual LED illuminants 100, 101, 102, 103, 104 of an LED lighting group 10-18 can be identified relatively accurately as over-radiating elements (these emit too much light in proportion to other LED illuminants 100, 101, 102, 103, 104) or as underradiating elements (these emit too little light in proportion to other LED illuminants 100, 101, 102, 103, 104). These individual LED illuminants 100, 101, 102, 103, 104 identified in this manner can now have their brightness corrected upward or downward on the basis of the light reflected into the high-speed image recording device 30, 31, 32 or the resultant image with a corresponding brightness distribution.

In further steps, it is possible to make additional optimizations in the light radiation from the individual LED illuminants 100, 101, 102, 103, 104, so that an image illuminated with maximum homogeneity can be obtained. What is a homogeneous image for the first high-speed image recording device 30 may result in relatively poor homogeneity for a second high-speed image recording device 31 positioned at a different setup location, however, particularly on account of the light beams that are reflected differently in this direction. A similar situation also applies to the remainder of the high-speed image recording devices 32 positioned on an illumination side of the object 2. The method described above is therefore likewise (preferably simultaneously) performed for the second and every further high-speed image recording device 31, 32. It is self-evident that the best light configurations cannot be achieved and found simultaneously for all the high-speed image recording devices 30, 31, 32 on one side.

The lighting apparatus 1 is preferably calibrated by means of a closed control loop, as shown in FIG. 3. A parameter setpoint encoder makes a parameter set available to the lighting apparatus 1 for the purpose of actuating the LED lighting units 10-18, said parameter set being used to light the object 2. The high-speed image recording devices 30, 31, 32 are used to depict the lit object 2 with the reflected brightness values. However, these reflected brightness values no longer correspond to the original required parameter set, since they have had their brightness distribution altered by the reflections at the object 2. The images with altered brightness are used to calculate a correlation, what is known as the actual correlation, and said correlation is supplied to a required/actual comparison with a required correlation. The parameter setpoint encoder then generates the next parameter set and introduces it back into the control loop. This takes place iteratively until the parameter selections come closest to the returning actual data record. This allows the best achievable light adaptation to be found for all the high-speed image recording devices 30, 31, 32 together.

All the settings that have been undergone in sync for the high-speed image recording devices 30, 31, 32 on an illumination side of the object 2 in the manner described above must subsequently be subjected to a computation procedure and, in so being, must be processed. In this case, the maximum homogeneity in each case must be achieved in all the images from the high-speed image recording devices 30, 31, 32 at one intensity setting of the LED illuminants 100, 101, 102, 103, 104. To this end, it is first of all necessary to acquire a large numeric base with very many parameters. First of all, the radiated luminous flux is the variable. This needs to run through a plurality of LED lighting units 10-18 with their LED illuminants 100 arranged in the columns and rows. Then come the geometrical parameters, particularly the radiation angles in azimuth and inclination, which can be set using actuator means and which need to run through different numbers of levels, depending on quantization. In order to obtain an acceptable quantity of parameters, all the parameters need to comprise as few variables as possible.

The calculation of a cross-correlation can be used to calculate the similarity of the brightness distributions in all the high-speed image recording devices 30, 31, 32 installed on one illumination side of the object 2. In this connection, it is advantageous if this calculation involves the object 2 being extracted from its image surroundings by means of an image processing operation that is performed by the evaluation device. This would allow only the brightness distributions on the object 2 to be taken into account, but not additionally those from the insignificant surroundings of the object 2.

The basis for the calculation of this cross-correlation is formed by the histogram already mentioned above and the characteristic quantities derived therefrom, frequency, mean value and variance of the grayscale values. This correlation value indicates the degree to which the brightness distributions of the various images from the high-speed image recording devices 30, 31, 32 match. The best light setting for the LED illuminants 100, 101, 102, 103, 104 for a plurality of high-speed image recording devices 30, 31, 32 simultaneously is obtained in the case of that parameter configuration for which the correlation coefficient comes closest to the number 1.

The quantization of all the parameters governs how many parameter variants need to be set and measured in practice. A simplistic effect (reducing the calibration complexity) is likewise obtained when brightness variations in the columns and rows of an LED lighting unit 10-18 are handled collectively, rather than each of the LED illuminants 100, 101, 102, 103, 104 in all the possible brightness variants as individual parameters. In the case of lighting apparatuses 1 in which, by way of example, only the azimuth and not also the inclination (elevation) of the LED lighting units 10-18 or of the LED illuminants 100, 101, 102, 103, 104 of the LED lighting units 10-18 are variable, the calibration complexity is reduced again.

After a first illumination side of the object 2 has been optimized, the lighting of the second, opposite illumination side is set using the same method. The optimized lighting setting is then made for the top of the object 2. When this optimization is at an end, it can be established in most cases that sudden brightness changes or inhomogeneities arise at the transitions from the top to the two longitudinal sides of the object 2. In this case, further optimization and alignment is required. The best illumination found for the top must now be adjusted progressively from above in equal brightness change steps for each LED illuminant 100, 101, 102, 103, 104 until the transition to one of the two longitudinal sides is at an optimum. This is accomplished with brightness levels that are already present. The same needs to be accomplished on the opposite transition between the top and the longitudinal side. If it is found that different brightness levels from above resulted in optimized illumination for both transitions, a suitable compromise needs to be found between the two sides.

Since good homogeneity of the illumination has been achieved for lighting from above, customization of a first transition between the top and one of the two longitudinal sides of the object 2 now requires the lighting intensity of the LED illuminants of the LED lighting units arranged over the top to be switched in the brightness direction of the lighting of the top evenly over all the LED illuminants in steps of 10% brightness change, for example. In this case, preferably, the (opposite) transition between the top and the second longitudinal side should also be captured continuously in order to ascertain the homogeneity of the illumination at that point also. If the same direction of brightness change applies to both sides, in further steps it is possible to switch until the transition on one of the two longitudinal sides is at an optimum. The other longitudinal side then needs to be brought to the level of a compensation for the brightness of the top with the side lighting using a constant change over all the LED illuminants 100, 101, 102, 103, 104.

If the requisite brightness changes on the two longitudinal sides are in opposite directions, the left- and right-hand sides need to be brought to the level of the lighting at the top independently of one another, again in small lighting change steps that are uniform over all the LED illuminants 100, 101, 102, 103, 104 on the whole side.

When this process has been performed once for each vehicle type and each collision type and the optimized brightness and radiation direction values have been stored in memory means, real trials require only the model and the collision type to be input, and the lighting apparatus 1 is automatically set to the stored values. If this light setting adaptation were to be performed visually/manually instead, there would be considerable associated time involvement. If a number of vehicle models is assumed to be 10 and a number of trial types is likewise assumed to be 10, for example, then the result is already a total of 100 setting variants.

The time involvement for a visual/manual light adaptation procedure with the illumination quality described can be estimated at approximately two working days for one vehicle model. Owing to this time involvement, it is indispensible for this light adaptation work for the exemplary 100 configurations again to be able to be accomplished only fully automatically and under computer control.

It is possible to comprehend that computer-controlled actuators for direction setting for the LED illuminants 100, 101, 102, 103, 104, for setting the radiation intensity of the LED illuminants 100, 101, 102, 103, 104 and for the requisite histogram evaluation for the images using an evaluation device that is designed for this purpose takes only a fraction of the time of visual/manual adaptation work. If it is assumed that adaptation work requires over 300 mechanical variations, brightness changes and, furthermore, typically approximately 1000 image loading and image processing cycles, then a period of approximately one hour can be assumed for complete light adaptation. On account of the automation that is provided by means of the method presented here, the presence of an operator is not necessary.

The change steps for all the parameters should be reduced to a minimum, since otherwise an unacceptable number of measurement cycles for practical implementation would come together. For this reason, it is also necessary to enter the calibration of the lighting apparatus 1 with very good starting values (initialization parameter values). The better these starting values have been calculated or estimated, the less time taken up by the calibration process.

In order to ascertain very good starting values, it is expedient for a computer simulation to be preceded by a high-quality computation model of the practical calibration. By varying lighting parameters, real external vehicle contours from CAD data, the application of correct physical reflection, absorption and diffusion laws and also the properties of different light wavelengths (colors), etc., it is possible for the light adaptation parameters to be calculated to a high degree of quality in a model.

The radiation angles and luminous fluxes calculated by simulation for the LED illuminants 100, 101, 102, 103, 104 need only be transferred to the control device. The control device sets the values calculated by simulation using the actuator means. An immediate test with these setting data shows the quality of the simulation.

The calculated starting values for a good simulation program provide the confirmation that the calibrations reduced to a minimum nevertheless result in a sufficient number of setting data for reliably finding parameters in the best possible way for all the high-speed image recording devices 30, 31, 32 simultaneously.

Figure 4:
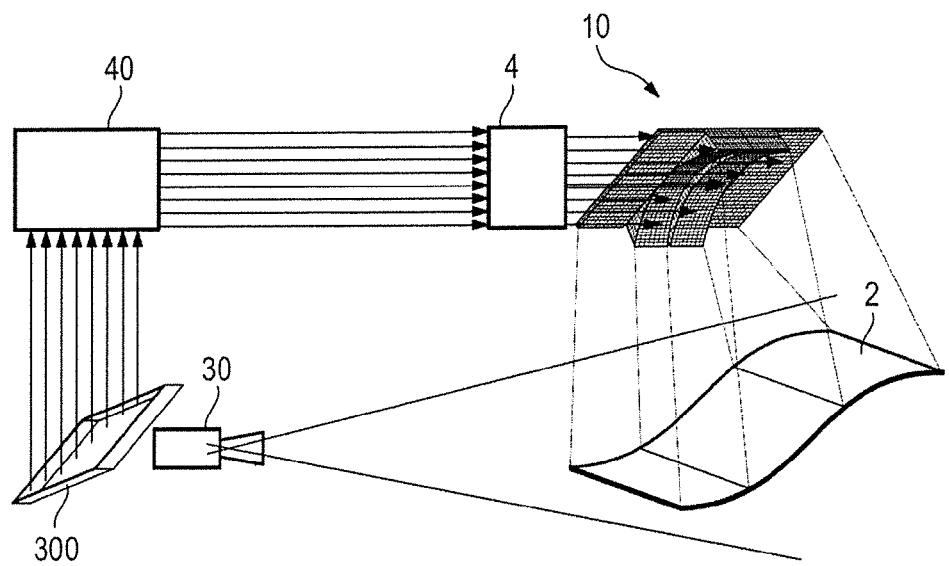
FIG. 4 is a schematically highly simplified illustration of the lighting apparatus while lighting the object.

Finally, FIG. 4 again schematically shows the lighting of the object 2 by means of an LED lighting unit 10 of the lighting apparatus 1 and the image recording by means of a high-speed image recording device 30. The actuator means, which are designed to vary at least the lighting intensities and/or the radiation directions of the LED illuminants 100, 101, 102, 103, 104 of the LED lighting unit 10 individually or in groups, are actuated by means of the control device 4 via provision of sets of parameters. The high-speed image recording device 30 captures the brightness distribution of the light reflected by the object 2 using a chip matrix 300. An interface means 40 forms an interface between the chip matrix 300 and the control device 4, so that it is possible for the brightness distribution on the object 2 to be customized by changing the sets of parameters for actuating the illuminants 100, 101, 102, 103, 104 of the LED lighting unit 10.

What is claimed:

1. An adaptive lighting apparatus for use with a high-speed image recording device, the adaptive lighting apparatus comprising:
    a multiplicity of LED lighting units, each LED lighting unit having a multiplicity of LED illuminants that can emit enough light to sufficiently illuminate a target object during operation of a high-speed image recording device configured to record hundreds of images of the target object per second;
    an actuator for actuating the multiplicity of LED lighting units and varying at least the lighting intensities and/or the radiation directions of the LED illuminants individually or in groups;
    a control device for controlling the actuator, the control device having a memory that stores a parameter set that includes lighting intensity parameters and/or radiation direction parameters for actuating the LED lighting units in order to sufficiently illuminate the target object; and
    an evaluation device for calibrating the adaptive lighting apparatus, the evaluating device being configured to evaluate the hundreds of images of the target object that are recorded by the high-speed image recording device and to calculate the parameter set for adaptively actuating the LED lighting units.

2. The adaptive lighting apparatus of claim 1, wherein the evaluation device is configured to perform image brightness analysis for the target object illuminated by the adaptive lighting apparatus and to generate a brightness histogram.

3. The adaptive lighting apparatus of claim 1, wherein the memory stores a multiplicity of parameter sets for adaptively lighting at least one target object in a plurality of different ambient conditions and/or trial conditions, and wherein the control device is configured to selectively retrieve the parameter sets.

4. The adaptive lighting apparatus of claim 1, wherein the memory stores location information for the LED lighting units, and wherein the control device uses the location information to associate the LED lighting units with subregions on the target object to be illuminated.

5. The adaptive lighting apparatus of claim 1, wherein the LED illuminants of the LED lighting units are arranged in a number of rows and a number of columns.

6. A method for calibrating the adaptive lighting apparatus of claim 1, the method comprising:
   a) activating the adaptive lighting apparatus and illuminating a first side of the target object using at least one of the LED lighting units;
   b) recording a set of images of the target object by a multiplicity of high-speed image recording devices;
   c) analyzing an image brightness parameters for each image to obtain a brightness histogram and determining overexposed and underexposed regions of the target object;
   d) associating the LED lighting units with the regions of the target object that are illuminated thereby,
   e) providing a parameter set for actuating the LED lighting units to set at least the lighting intensities and/or the radiation directions of the LED illuminants of the LED lighting units that are used to illuminate the target object,
   f) recording a next set of images of the target object by the multiplicity of high-speed image recording devices,
   g) calculating an actual correlation of the next set of images from the previous set of images and comparing the actual correlation with a required correlation,
   h) repeating steps e) to g) with changed lighting intensities parameters and/or radiation direction parameters until the actual correlation essentially corresponds to the required correlation; and
   i) storing the changed parameters in the memory.

7. The method of claim 6, further comprising calculating similarities in the brightness distributions of the captured images from the multiplicity of high-speed image recording devices using cross-correlation.

8. The method of claim 6, wherein the calibration of the first side of the target object is followed by the performance of method steps a) to i) for at least one additional side of the target object.

9. The method claim 8, wherein parameters for actuating the LED lighting units are reduced to parameter sets by quantization.

10. The method of claim 9, wherein the calibration of the adaptive lighting apparatus involves calibration starting values obtained from simulations, being set as initialization parameters for actuating the LED lighting units.

* * * * *